July 14, 1925.
D. BUMGARDNER
ATTACHMENT FOR DENTURES
Filed April 25, 1924
1,545,734
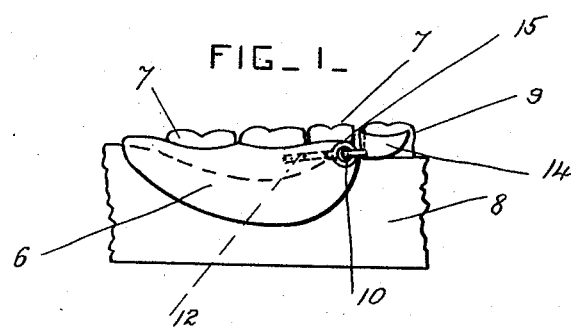
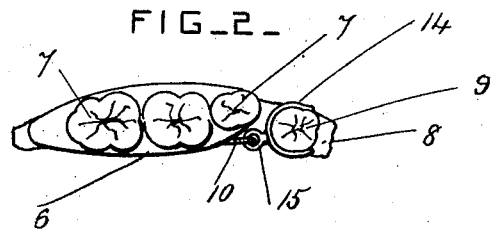
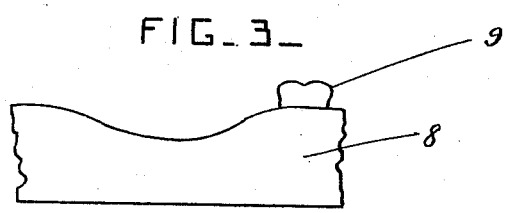
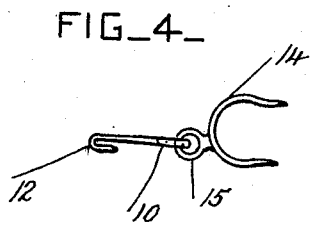
Inventor
Dayton Bumgardner
by Herbert W. T. Jenner
Attorney.

Patented July 14, 1925.

1,545,734

UNITED STATES PATENT OFFICE.

DAYTON BUMGARDNER, OF CHICAGO, ILLINOIS.

ATTACHMENT FOR DENTURES.

Application filed April 25, 1924. Serial No. 708,991.

*To all whom it may concern:*

Be it known that I, DAYTON BUMGARDNER, a citizen of the United States, residing at Chicago, in the county of Cook and State of Illinois, have invented certain new and useful Improvements in Attachments for Dentures, of which the following is a specification.

This invention relaters to bridgework or artificial dentures used in the human mouth; and it consists in the novel construction and combination of the parts hereinafter fully described and claimed whereby the denture is secured in place and whereby its attaching clasp is permitted to have a predetermined pivotal movement so as to avoid the transmission of the strain due to mastication to the anchorage.

In the drawings, Figure 1 is a side view showing conventionally a portion of a human gum with an artificial denture or bridgepiece secured in place according to this invention. Fig. 2 is a plan view of the same. Fig. 3 is a side view of the gum shown in Fig. 1 with the denture removed. Fig. 4 is a detail view of the eye-bolt and clasp removed from the denture and drawn to an enlarged size for clearness.

The denture comprises a saddle 6 of vulcanized india rubber or other suitable material and one or more artificial teeth 7 secured in it, three teeth being shown. The saddle is applied to the human gum 8 as shown in Fig. 1, and is secured to an anchorage such as a natural tooth 9, or a stump properly built up or capped to simulate same.

An eye-bolt 10 is provided, and it preferably has a hooked shank 12 which is embedded permanently in the material of the saddle. The eye of the eye-bolt is arranged in a substantially vertical plane, and preferably at the inner side portion of the saddle. The eye however may be rigidly secured to the denture by any other approved means besides the hooked shank shown.

A clasp 14 is provided for engaging with the natural tooth or anchorage 9. This clasp has an eye 15 formed on it or otherwise rigidly secured to it and arranged in a substantially horizontal position. The eyes are both preferably formed of round wire, and are substantially circular in form. The eye of the eye-bolt 10 engages with the eye 15 and a linked connection is formed, which holds the denture in place, and permits the clasp to have a movement to a predetermined and limited extent pivotally in every direction, to conform to the movements of the mouth in the act of masticating food.

This free movement, when the denture is in position, assists in breaking or neutralizing the strain of mastication, and allows the strain to fall upon the alveolar ridge of the gum upon which the saddle fits, and relieves the natural tooth or anchorage from the strain which would otherwise be put upon it by the clasp, if the linkwork attachment were not provided. The arrangement of the eyes 10 and 15 permits the saddle to rock or oscillate on the axis of the shank, in addition to being free to move pivotally both vertically and horizontally, so that the saddle can adjust itself automatically to the alveolar ridge.

What I claim is:

1. An artificial denture provided with a saddle, a substantially circular eye having a shank which is embedded in the saddle, and a clasp for retaining the denture in place provided with a substantially circular eye which engages pivotally with the aforesaid eye and which also permits it to rock on the axis of its shank.

2. An artificial denture provided with a saddle, a substantially circular eye provided with a shank which is embedded in the inner side portion of the saddle near one end thereof, and a clasp for retaining the denture in place provided with a substantially circular eye which engages pivotally with the aforesaid eye.

3. An attachment for an artificial denture, comprising a substantially circular eye provided with a shank adapted to be secured to the denture, and a clasp for retaining the denture in place provided with a substantially circular eye which engages pivotally with the aforesaid eye and permits it to rock on the axis of its shank.

4. An artificial denture provided with a saddle, an eye-bolt provided with a hooked shank which is embedded in the saddle, and a clasp for securing the denture in place provided with an eye which engages pivotally with the eye of the eye-bolt.

5. An attachment for an artificial denture, comprising a substantially circular eye formed of round wire and provided with a shank for engaging with the denture, and a retaining clasp provided with a substantially circular eye formed of round wire and engaging pivotally with the aforesaid eye.

In testimony whereof I have affixed my signature.

DAYTON BUMGARDNER.